(No Model.)

T. WALKER & J. F. CARTER.
SEPARATOR.

No. 545,258. Patented Aug. 27, 1895.

Witnesses:
Albert Popkins
W. M. McNeely

Inventors:
Thomas Walker &
John F. Carter
by their attorneys
Howson & Howson

United States Patent Office.

THOMAS WALKER AND JOHN F. CARTER, OF PHILADELPHIA, PENNSYLVANIA, ASSIGNORS TO JOHN A. BARHAM AND JOSEPH A. VINCENT, OF SAME PLACE.

SEPARATOR.

SPECIFICATION forming part of Letters Patent No. 545,258, dated August 27, 1895.

Application filed May 23, 1893. Serial No. 475,284. (No model.)

*To all whom it may concern:*

Be it known that we, THOMAS WALKER and JOHN F. CARTER, citizens of the United States, and residents of Philadelphia, Pennsylvania, have invented certain Improvements in Separaters, of which the following is a specification.

The object of our invention is to construct an amalgam-separator in such a manner that it will quickly separate the amalgam from foreign matter and so arrange it that the amalgam can be readily taken away. The apparatus enables the process to be carried on continuously. This object we attain in the following manner, reference being had to the accompanying drawings, in which—

Figure 1:
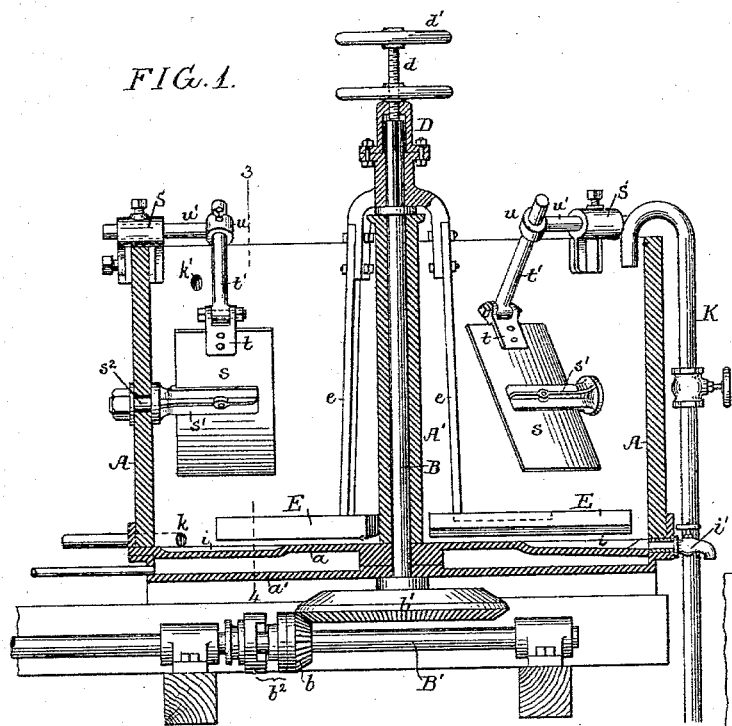
Figure 2:
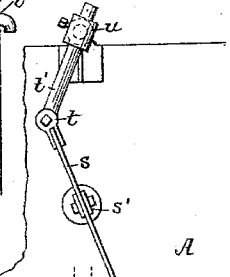
Figure 3:
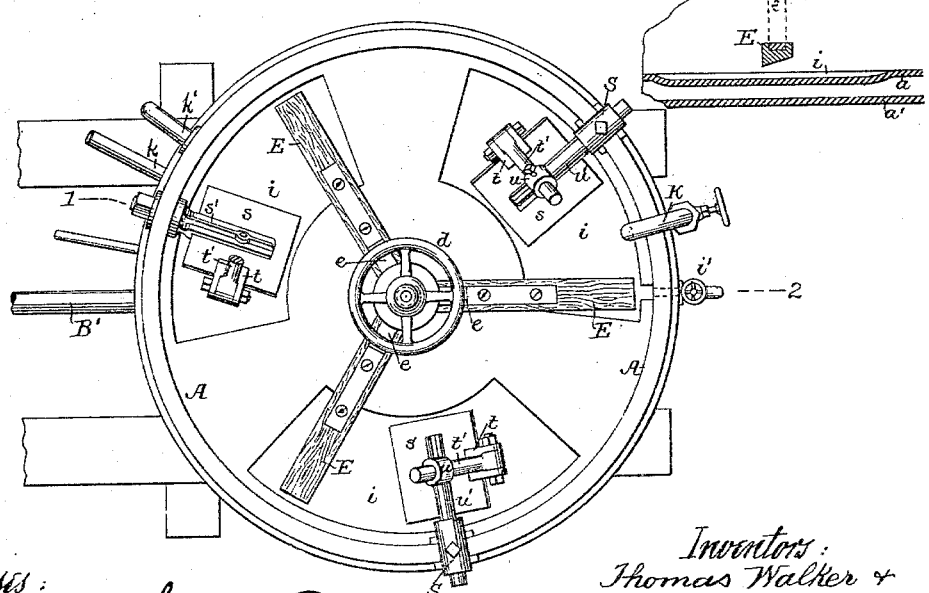

Figure 1 is a transverse section on the line 1 2, Fig. 3. Fig. 2 is a transverse section on the line 3 4, Fig. 1; and Fig. 3 is a plan view of the apparatus.

Our invention is especially adapted for the collection of gold, using mercury as the amalgamating agent.

A is the pan, preferably made hollow, having a main bottom $a$ and a false bottom $a'$ to allow for the passage of steam between the two, in order to keep the material at the bottom at a given temperature. Mounted on the pan A is a cylinder, of wood or other material, forming the sides of the tank containing the material to be treated, carried by a sufficient amount of water. Mounted in the center of the pan is a post A', and passing through this post is a shaft B, carrying at its upper end a head D, adjustable vertically on the shaft by an adjusting-screw $d$, provided with a suitable handle $d'$. Secured to the head D are arms $e$, three in the present instance. These arms extend into the tank, and secured to them are blades E, preferably made of wood. The tank is stationary and the blades revolve, motion being given to the shaft B by a driving-shaft B', geared to the shaft B by bevel-gears $b$ $b'$. A clutch $b^2$, of any ordinary form, is preferably mounted on the shaft B', so that the shaft B may be thrown into and out of gear when necessary. In the upper surface of the bottom of the pan A are a series of depressions $i$, in which the mercury and amalgam collect. We have shown three of these depressions in the present instance, but it will be understood that the number may be increased or diminished without departing from our invention. One of the depressions communicates with an outlet-pipe I, having a suitable valve $i'$, so that by turning said valve the contents of the depressions or pockets can be drawn off. The contents of the other pockets or depressions can be discharged into the pocket having the outlet by paddles or other means, and in some instances these pockets may be connected by channels, as shown by dotted lines in Fig. 3, or each pocket may be provided with an independent outlet. The fluid above the bottom of the tank is drawn off through a suitable opening $k$ to waste, and water is admitted to the tank through the pipe K. We also provide an overflow-outlet $k'$ near the upper edge of the tank, as it will be understood that a constant stream of water enters the tank, and the outlet is so arranged as to keep the fluid in the tanks at the proper level. In some instances, however, an intermittent flow of water may be permitted without departing from our invention.

Pivoted to the side of the tank are blades $s$, which are situated above each pocket or depression $i$ and direct the water carrying the material toward the pockets, so that the gold carried will be caught by the amalgam and will be separated from the gangue, as there is at all times a sufficient amount of mercury in the pockets or depressions to form an amalgam. These blades $s$ are secured to an arm $s'$, having a spindle $s^2$, projecting through the tank and provided with a clamping-nut, and attached to the upper end of the blades is a plate $t$, to which is pivoted a rod $t'$, passing through a head $u$ of a rod $u'$. A suitable set-screw is provided for attaching the rod to the head. The rod $u'$ passes through a block S clamped to the body of the tank, in which is a set-screw which confines the said rod $u'$ to the block. By this means the blades can be turned to any angle desired by the mechanism above described, so as to properly direct the material to the depressions or pockets. The blades E, which travel in close proximity to the bottom of the tank, also direct the material into the pockets, being inclined, as shown in Fig. 2.

We prefer to run the apparatus in series, providing three tanks, so that one tank can be charged with material while another is working and the third is being emptied and cleaned. Thus the operation is a continuous one when three tanks are used. In some instances we may add riffles or projecting ribs to the bottom of the tank at one edge of each depression, so as to prevent the material carrying the amalgam with it. When the riffles or ribs are used, the pockets need not be as deep as when the pockets are used without the ribs.

We claim as our invention—

1. The combination in a separator, of the tank, depressions or pockets in said tank containing amalgam, circulating blades elevated above the bottom of the tank by which motion is given to the material under treatment, with horizontally pivoted blades mounted on the body of the tank so that they can be adjusted to direct the material toward the pockets, substantially as described.

2. The combination of the stationary tank, amalgam collectors in the bottom of the tank, movable blades arranged above the bottom of the tank, mechanism for moving said blades, with blades horizontally pivoted to the side of the tank to direct the material down toward the collectors, a rod attached to the upper end of each blade, and adjustably secured to the tank, so that the blades can be set at different angles, substantially as described.

3. The combination of the pan formed of two plates providing a steam space, for heating the pan, side walls forming with the pan a tank, inclined blades on the walls of the tank, extended depressions or pockets in the said pan, directly under the blades an independent valved passage communicating with one or more of said depressions, whereby the amalgam is carried away from the apparatus, water inlet and outlet, circulating blades mounted above the bottom of the tank, a central shaft to which said blades are secured, and mechanism for driving said shaft, substantially as described.

4. The combination of the stationary tank, amalgam collectors in the bottom of the tank, a vertical shaft, blades carried thereby, an arm $s'$, a blade $s$ thereon, a rod $t'$ pivoted to the upper portion of the blade, a rod $u'$ having a head $u$ through which the rod $t'$ passes, a pivot block S for the rod $u'$ with set screws for retaining the rods $u'$ and $t'$ in place, substantially as specified.

5. The combination of the stationary tank, amalgam collectors in the bottom of the tank, a vertical shaft, blades carried thereby, an arm $s'$, a blade $s$ thereon, said arm extending through the tank and provided with a clamping nut, a rod $t'$ pivoted to the upper portion of the blade, a rod $u'$ having a head $u$ through which the rod $t'$ passes, a pivot block S for the rod $u'$ with set screws for retaining the rod $u'$ and $t'$ in place, substantially as specified.

In testimony whereof we have signed our names to this specification in the presence of two subscribing witnesses.

THOMAS WALKER.
JOHN F. CARTER.

Witnesses to the signature of Thomas Walker:
HENRY JUNKIN,
R. CAMPAN.

Witnesses to the signature of John F. Carter:
JOSEPH H. KLEIN,
HENRY HOWSON.